(12) United States Patent
Foster et al.

(10) Patent No.: US 6,512,868 B1
(45) Date of Patent: Jan. 28, 2003

(54) PRECISION FIBER OPTIC COLLIMATOR

(75) Inventors: Jack D. Foster, Los Altos, CA (US); James Bryan, Pleasanton, CA (US)

(73) Assignee: XROS, Inc., Santa Clara, CA (US)

(*) Notice: Subject to any disclaimer, the term of this patent is extended or adjusted under 35 U.S.C. 154(b) by 0 days.

(21) Appl. No.: 09/715,915

(22) Filed: Nov. 16, 2000

Related U.S. Application Data

(60) Provisional application No. 60/191,411, filed on Mar. 23, 2000, provisional application No. 60/176,941, filed on Jan. 18, 2000, and provisional application No. 60/165,863, filed on Nov. 16, 1999.

(51) Int. Cl.[7] .................................................. G02B 6/32
(52) U.S. Cl. ............................................. 385/33; 385/93
(58) Field of Search ........................ 385/15, 25, 33–35, 385/60, 66, 72, 78, 88, 91–93

(56) References Cited

U.S. PATENT DOCUMENTS 5,659,645 A * 8/1997 Satake .......................... 385/33
5,937,123 A * 8/1999 Frelier .......................... 385/79
6,179,483 B1 * 1/2001 Kanazawa .................... 385/93

FOREIGN PATENT DOCUMENTS

JP          62-235909       * 10/1987

* cited by examiner

Primary Examiner—Khiem Nguyen
(74) Attorney, Agent, or Firm—Fish & Richardson P.C.

(57) ABSTRACT

A mechanism for reducing radial offset in a collimnated optical beam associated with an angled end fiber and minimizing an angular offset caused by collimator lens centration errors is presented. An angled end fiber is oriented in a supporting collimator so that the angled surface of the fiber is parallel to the collimator axis, thereby compensating for the radial offset. The angled end fiber is again so oriented after the angular-offset producing collimator lens rotation (used to determine the optical center of the lens) and the collimator lens is moved in a direction parallel to the collimator axis to provide a desired output focal position for the lens.

10 Claims, 4 Drawing Sheets

PRECISION FIBER OPTIC COLLIMATOR

CROSS REFERENCE TO RELATED APPLICATIONS

This application claims priority from the following U.S. Provisional Patent Applications, the disclosures of which are incorporated by reference in their entirety for all purposes:

U.S. Provisional Patent Application Ser. No. 60/176,941, entitled "Precision Fiber Optic Collimator," filed Jan. 18, 2000; U.S. Provisional Patent Application Ser. No. 60/165,863, entitled "Improvements for an Optical N×N Switch," filed Nov. 16, 1999; and U.S. Provisional Patent Application Ser. No. 60/191,411, entitled "Collimator Plate for an N×N Switch," filed Mar. 23, 2000.

BACKGROUND OF THE INVENTION

The invention relates to optical devices known as collimators.

A collimator includes a lens positioned in a output beam that emanates from a single mode optical fiber. The lens transforms the beam into an approximately parallel optical beam over an extended distance. Minimization of back-reflection from the fiber end necessitates an angle of approximately 8 degrees on the fiber output surface. This angled fiber-end, in turn, produces a radial offset of the parallel optical beam from the collimator axis. Centration errors in lenses produce angular offsets between the parallel optical beam and the collimator axis. Both of these offsets can prevent the collimated optical beam from reaching an intended target.

Fiber-optic networks use arrangements of collimators with micromachined mirrors to provide optical interconnect switching between optical fibers. These optical networks require that the collimators point input light beams towards the mirrors with great precision. More particularly, each of these collimators has a one to one direct correspondence to the mirror in front of it and needs to aim its beam directly towards the center of the corresponding mirror. As switches increase in size, the distance between the collimator and the corresponding mirror increases also, and the pointing becomes more of a challenge.

To achieve accurate pointing, collimators provide optical beams with small radial offset over various distances to the micromachined mirrors. In addition, the centration of the lens focus and the external cylindrical axis of the lens body must be better than 5 micron, a figure which is extremely difficult to achieve in the fabrication of lenses.

SUMMARY OF THE INVENTION

In one aspect of the invention, collimating an optical beam includes: providing a collimator body having a ferrule coupled to a concentric bore which is coupled to a lens holder for supporting a lens, the concentric bore being centered within the body around a first axis, the ferrule having an angled end fiber centered therein and being positioned within the body about a second axis that is inclined relative to the first axis, the axes forming a plane therebetween; and adjusting the position of the ferrule to position an optical beam exiting the angled end fiber within the plane along a path that is parallel to the first axis within the plane.

Embodiments of the invention may include one or more of the following features.

Collimating an optical beam can further include rotating the lens holder about the first axis to set an optical center of the lens in the plane, again adjusting the position of the ferrule and moving the lens holder in a direction parallel to the first axis to position the optical center at a desired distance from the angled end fiber.

Among the advantages of the present invention are the following. The collimating scheme of the invention produces a degree of pointing accuracy that is required by demanding applications like fiber-optic switching.

Other features and advantages of the invention will be apparent from the following detailed description and from the claims.

DETAILED DESCRIPTION

FIGS. 1A–1D illustrate a scheme for improved pointing accuracy 10 in an optical path having an optical fiber 12 being received at a collimator lens 14, which produces a collimated output optical beam 16 that is directed towards a target (not shown). The optical fiber has an angled end for reduction of back reflection, as is known in the art.

Figure 1A:
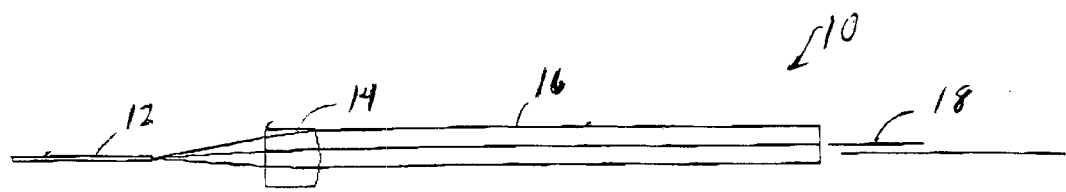
FIGS. 1A–1D are schematic illustrations of offset and offset minimization for a collimator lens being used with an angled fiber.
Figure 1B:
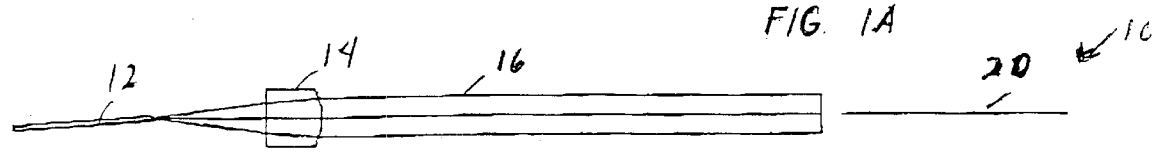
Figure 1C:
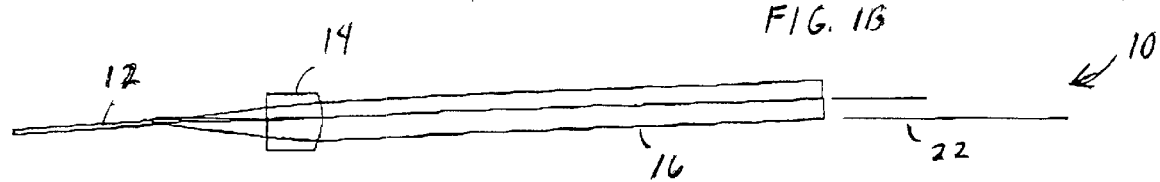
Figure 1D:
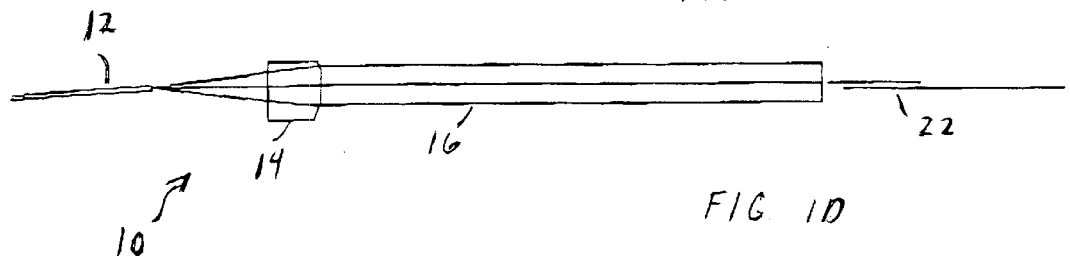

Referring to FIG. 1A, the lens 14 is an ideal lens and the optical beam 16 produced by the lens has an offset 18. Referring to FIG. 1B, it can be seen that inclining the optical fiber 12 at an inclined axis to align with the axis of the ideal lens 14 produces the collimated optical beam 16 with no offset 20. Referring to FIG. 1C, the lens 14 is a real (non-ideal) lens having an associated centration error. Thus, the collimated optical beam 16 is produced with an angular tilt and thus results in larger offset 22 at a target. Referring to FIG. 1D, movement of the optical fiber 12 along the inclined fiber axis to align it with the decentered optical axis of the lens 14 and moving the lens 14 along the geometrical collimator axis to correct the focal position of the lens produces as the collimated optical beam 16 an optical beam having a minimum offset 22, which is equal to the decentration of the non-perfect lens.

Figure 2:
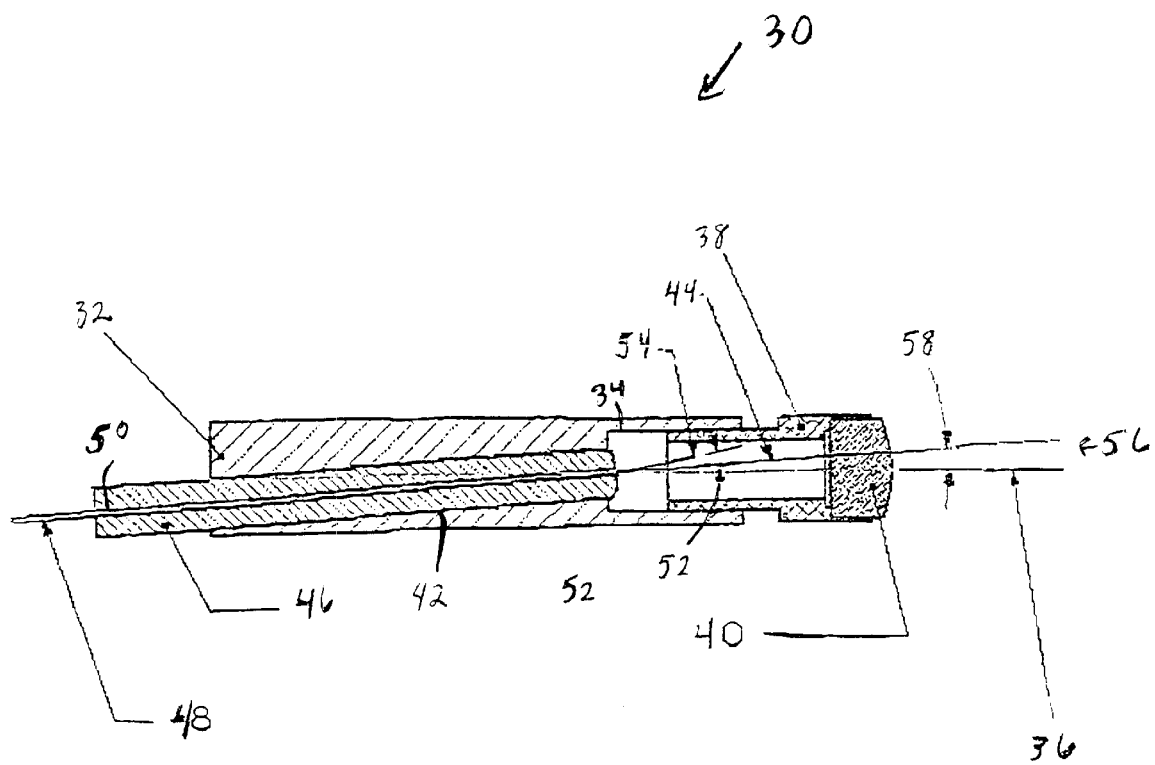
FIG. 2 is a detailed perspective side view of a collimator operated to achieve offset minimization as shown in FIG. 1.

Referring to FIG. 2, collimator 30 has a collimator body 32, which includes a concentric cylindrical bore 34 with concentric bore axis 36 that supports a lens holder 38. The lens holder is coupled to and supports a lens 40. The body 32 further includes an inclined bore 42 with an inclined bore axis 44. The inclined bore 42 is connected to the concentric bore 34 and supports a ferrule 46. A fiber 48 is bonded in an axial bore 50 centered in the ferrule 46. An anti reflection coated end of ferrule 46 and the fiber 48 is polished at a fiber angle 52. The ferrule 46 is rotationally aligned around the inclined bore axis 44 to position a normal to fiber end 54 of the fiber 48 in a plane defined by inclined bore axis 44 and concentric bore axis 36, a plane 56, at an inclination angle 58, which is the angle between the axes 44 and 36. The inclination angle 58 is chosen such that, together with the fiber angle 52, a refracted optical beam exits the fiber 48 into a direction that is parallel to the concentric bore axis 36.

Adjusting the position of the ferrule 46 along the inclined bore 42 and the inclined bore axis 44 thus positions the direction of the refracted optical beam exactly along the concentric bore axis 36. If the lens 40 is a perfectly centered lens 40, there is no offset associated with the collimated beam (as was illustrated in FIG. 1B).

If the lens 40 is not perfect and has a centration error (as was illustrated in FIG. 1C), additional steps can be taken to ensure offset minimization. Typically, the lens holder 38 is rotated in a bearing provided by the concentric bore 34 to set the optical center of the lens in the plane defined by the inclined bore axis 44 and concentric bore axis 36. Such rotation produces the condition shown in FIG. 1C. Thus, the position of the ferrule 46 is again adjusted along the inclined bore axis 44. This adjustment results in the optimum condition illustrated in FIG. 1D. In addition, to position the focal point of the lens 40 at a desired distance (in the Raleigh range) from the end fiber 48, the lens holder 38 is moved parallel with itself along the concentric bore axis 36 to position the waist of the exit beam at a desired maximum throw condition. The maximum throw of the Gaussian beam waist out of the collimator is measured with beam diameter measuring equipment. This cycle of movements is repeated as many times as necessary to produce convergence at the target (not shown).

Alternatively, a lens may be translated perpendicular to the axis 36 to set an optical center of the lens in the plane 56, and a ferrule (like ferrule 46) and the lens then adjusted along the axes 44 and 36, respectively, to achieve the results of FIG. 1D.

Thus, a systematic combination of ferrule and fiber movement along the inclined bore axis 44, and the rotation and movement of the lens holder 38 along the concentric bore axis 36 yields the result shown in FIG. 1D. The resulting offset is equal to the lens de-centration all along the optical beam and is the best achievable with a decentered lens. Thus, a very highly accurately positioned beam (relative to the bore axis 36 of the collimator 30) is obtained. Preferably, the collimator is conical in shape, but it may be cylindrical if so desired.

The above-described technique for improving collimator pointing accuracy can be implemented to use image detectors such as quad arrays, image tubes or CCD arrays placed at two distances from the collimator. Again referring to FIG. 2, image detectors (not shown) are aligned accurately on the axis of a support (not shown) for holding the collimator body 32. The ferrule 46 is rotated about the inclined bore axis 44 until the beam is centered in the direction perpendicular to the plane 56 at a detector close to the lens. This produces the condition of FIG. C, but, because the detector is close to the lens, the measurement will be very close to the same as in FIG. 1A. The lens holder 38 with the lens 40 is then rotated about the concentric bore axis 36 until the optical beam is centered in the direction perpendicular to the plane 56 at a detector a large distance from the lens 40, thus producing the condition of FIG. 1D. The ferrule 46 is then moved along the inclined bore axis 44 and the lens holder 38 along the concentric bore axis 36 until the beam is centered in the plane 56 at both detectors and is of the correct beam size as measured with a beam diameter scanning device (not shown).

Figure 3A:
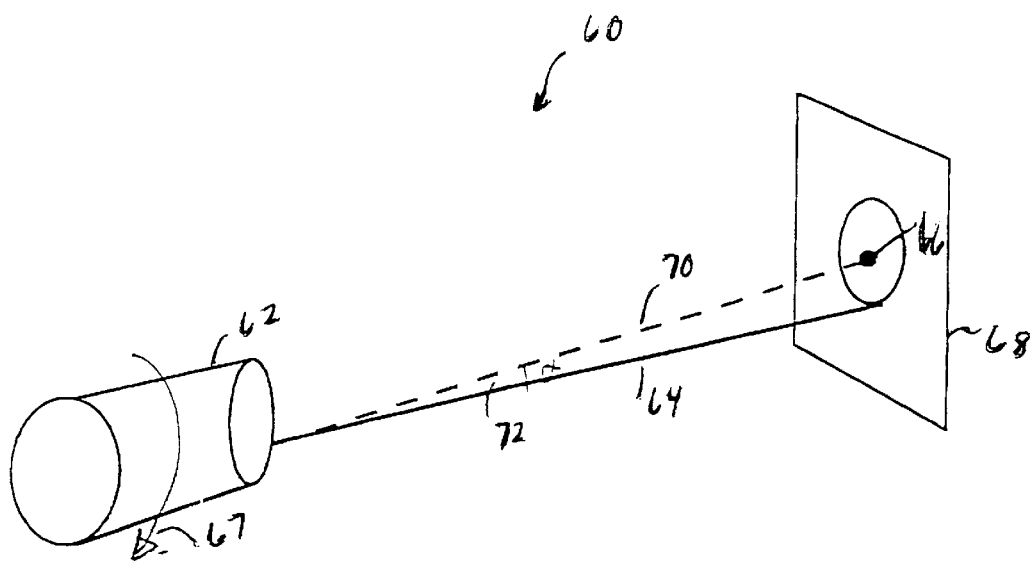
FIGS. 3A–3B are diagrammatic illustrations of a collimator being rotated about its axis and the effect of that rotation on pointing error at a mirror target.
Figure 3B:
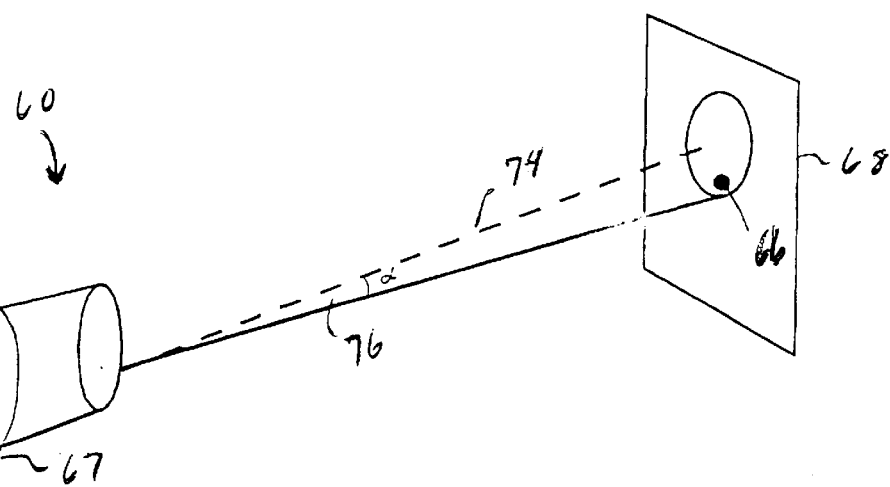

Turning now to FIGS. 3A and 3B, a collimator rotation scheme 60 for further enhancing pointing accuracy is shown. A conical-shaped collimator 62 causing an optical beam 64 to arrive at an intended target 66 on a targeted mirror 68 is shown.

Referring to FIG. 3A, if the collimator 62 is oriented exactly at the middle of the target 66 (an intended direction 70 indicated in dashed lines), then any deviation $\alpha$ 72 in the optics causes the optical beam 64 to hit the mirror 68 at a distance from the target 66 (i.e., the mirror center). In this instance, rotation 67 of the collimator in its mating surface (not shown) does not produce any improvement.

Referring to FIG. 3B, if the centerline of the collimator 62 is instead directed a small distance away from the center of the target 66 (that is, an intended direction 74), then the rotation 67 of the collimator 62 produces at least one location where the beam arrives much closer to the center of the mirror. Hence, it is desirable that an optical beam be directed away from the center 66 by a random amount equal to the average expected deviation $\alpha$ 76 of the beam from its intended direction. In this manner, therefore, the conical shape of the collimator 62 may be advantageously used to remove some of the alignment tolerances through rotation of the collimator 62.

Figure 4:
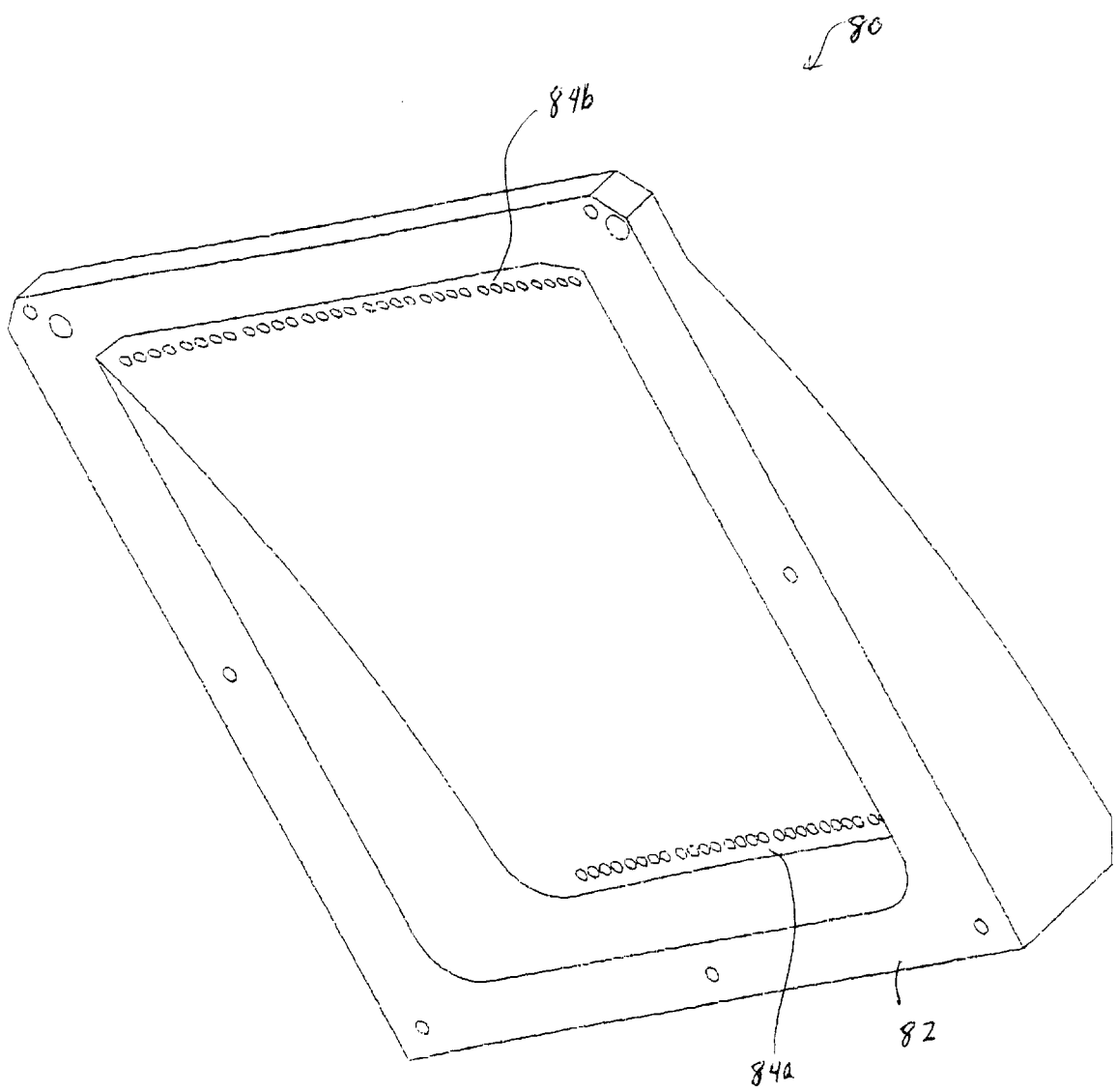
FIG. 4 is a perspective view of a spherical-shaped collimator holder having holes into which collimators are inserted or from which collimators are retracted.

Referring to FIG. 4, a collimator holder 80 having a curved portion, with a rectangular or near rectangular shaped plate 82 and holes 84a, 84b in the curved portion, is shown. A plurality of holes not shown exist between 84a and 84b. Since the holes 84a are located further from the corresponding mirrors, the collimator fabrication is made easier, as an optical beam has more time to contract before it hits a targeted mirror. The increased separation of the holes 84a, 84b also makes the insertion or retraction of the collimators easier to achieve.

Other embodiments are within the scope of the following claims.

What is claimed is:

1. A method of collimating an optical beam comprising:
   providing a collimator having a collimator body, the collimator body having a ferrule coupled to a concentric bore which is coupled to a lens holder for supporting a lens, the concentric bore being center within the body around a first axis, the ferrule having an angled end fiber centered therein and being positioned within the body about a second axis that is inclined relative to the first axis, the axes forming a plane therebetween; and
   rotating the ferrule about the second axis to position an optical beam exiting the angled end fiber within the plane along a path that is parallel to the first axis within the plane.

2. The method of claim 1 further comprising:
   rotating the lens holder about the first axis to set an optical center of the lens in the plane;
   adjusting the position of the ferrule; and
   moving the lens holder in a direction parallel to the first axis to position the optical center at a desired distance from the angled end fiber.

3. The method of claim 2, further comprising:
   repeating the steps of adjusting, rotating and moving until optical beam location and diameter is achieved at a target on a mirror towards which the optical beam is directed.

4. The method of claim 3, wherein the collimator body is conical in shape.

5. The method of claim 3, wherein the collimator body is cylindrical in shape.

6. The method of claim 3, wherein the distance is determined by beam diameter measuring equipment.

7. The method of claim 3, furthering comprising:
   rotating the conical shaped collimator body in a holder in which the collimator body is seated to direct the beam away from the target by a distance equal to an average expected deviation of the beam from the target so that the beam arrives closer to the target than it would without such rotation.

8. The method of claim 1 further comprising:

translating the lens perpendicular to the first axis to set an optical center of the lens in the plane;

again adjusting the position of the ferrule; and moving the lens holder in a direction parallel to the first axis to position the optical center at a desired distance from the angled end fiber.

9. A collimator for collimating an optical beam comprising:

a collimator body;

a ferrule disposed in the collimator body and coupled to a concentric bore centered with the body around a first axis, the ferrule having an angled-end fiber centered therein and being positioned within the body about a second axis that is inclined relative to the first axis, the axes forming a plane therebetween; and wherein the ferrule is controlled to rotate about the second axis to position an optical beam exiting the angled end fiber within the plane along a path that is parallel to the first axis within the plane.

10. The collimator of claim 9, further comprising:

a lens holder disposed in the body for supporting a lens, the lens holder being capable of rotational movement about the first axis to set an optical center of the lens in the plane; and wherein the lens holder is controlled for movement in a direction parallel to the first axis so as to position the optical center at a desired distance from the angled end fiber, the movement being controlled to occur following the positioning of the optical beam by the ferrule.

* * * * *